P. H. FONTAINE.
REVERSING GEAR FOR STEAM ENGINES.
APPLICATION FILED MAY 24, 1915.

1,221,716.

Patented Apr. 3, 1917.
2 SHEETS—SHEET 1.

Inventor,
P. H. Fontaine.

Witnesses:
C. Peinle, Jr.
R. M. Smith.

By Victor J. Evans,
Attorney.

P. H. FONTAINE.
REVERSING GEAR FOR STEAM ENGINES.
APPLICATION FILED MAY 24, 1915.

1,221,716.

Patented Apr. 3, 1917.
2 SHEETS—SHEET 2.

Witnesses:
C. Peinle Jr.
R. M. Smitt.

Inventor,
P. H. Fontaine.
By Victor J. Evans,
Attorney.

UNITED STATES PATENT OFFICE.

PHILIZA H. FONTAINE, OF PETERSBURG, NORTH DAKOTA.

REVERSING-GEAR FOR STEAM-ENGINES.

1,221,716. Specification of Letters Patent. Patented Apr. 3, 1917.

Application filed May 24, 1915. Serial No. 30,143.

*To all whom it may concern:*

Be it known that I, PHILIZA H. FONTAINE, a citizen of the United States, residing at Petersburg, in the county of Nelson and State of North Dakota, have invented new and useful Improvements in Reversing-Gears for Steam-Engines, of which the following is a specification.

This invention relates to reversing gears for steam engines, the object in view being to do away with the two eccentrics now commonly employed on the crank shaft of the engine and the rods extending therefrom to the oscillatory link, substituting in lieu thereof a single eccentric and connections between said eccentric and link whereby the latter is oscillated with a positive movement for the usual purpose.

With the above and other objects in view, the invention consists in the novel construction, combination and arrangement of parts, as herein described, illustrated and claimed.

In the accompanying drawings:—

Figure 1:
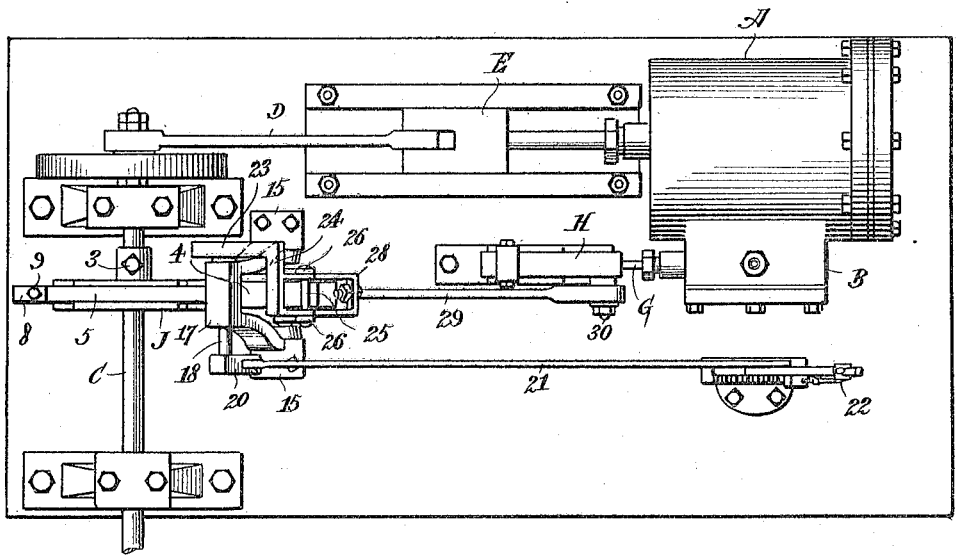
Figure 1 is a plan view of an engine equipped with the reversing gear of this invention.
Figure 2:
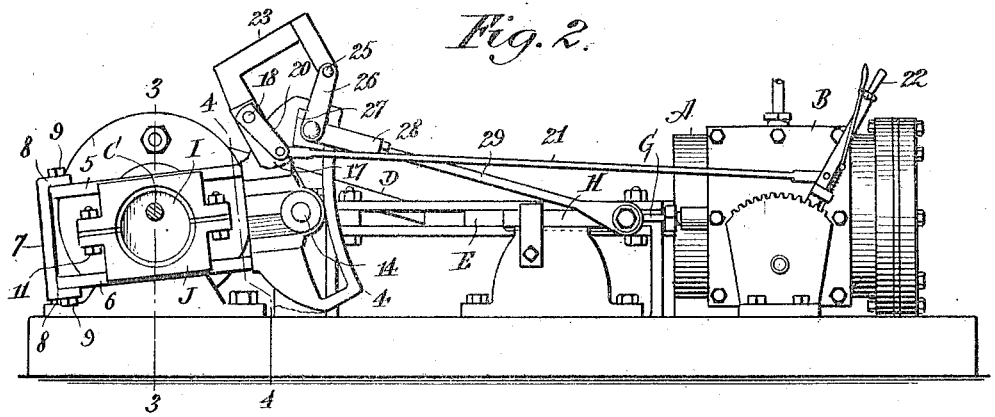
Fig. 2 is a side elevation of the same partly in section.
Figure 7:
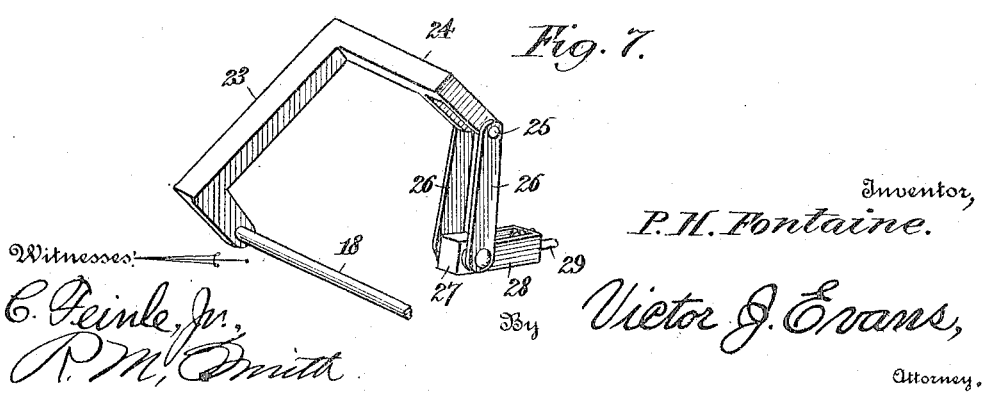
Fig. 7 is a similar view of the rock shaft and its crank arms.
Figure 3:
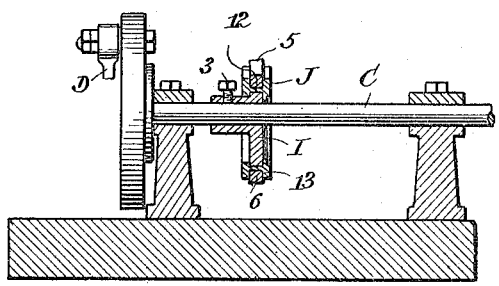
Fig. 3 is a cross section on the line 3—3 of Fig. 2.
Figure 4:
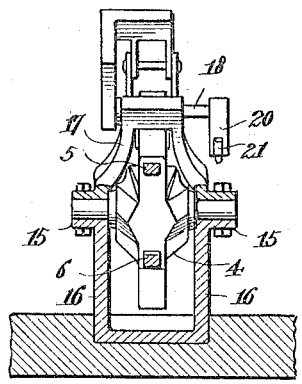
Fig. 4 is a cross section on the line 4—4 of Fig. 2.
Figure 5:
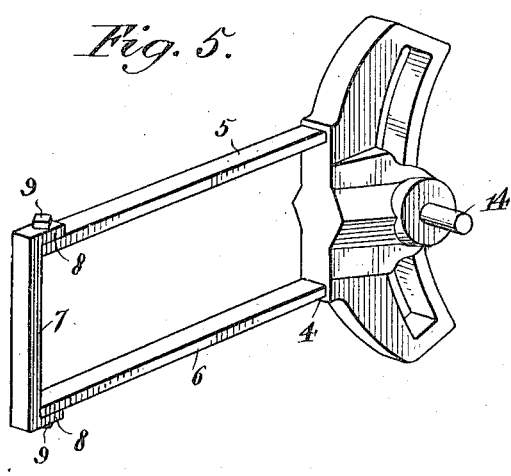
Fig. 5 is a detail perspective view of the link and its arm.
Figure 6:
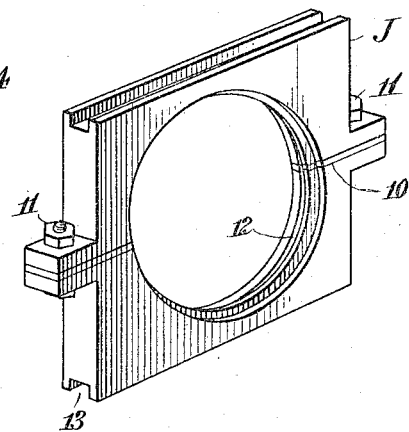
Fig. 6 is a similar view of the eccentric runner.

Referring to the drawings A designates the cylinder and B the valve chest of an ordinary stationary steam engine, C the crank shaft, D the pitman, E the sliding cross head, F the piston rod, G the stem of the slide valve working in the steam chest and H the sliding cross head for the valve stem, all of said parts being of the usual construction and arrangement.

In carrying out the present invention I employ a single eccentric 1 mounted on the crank shaft C and adapted to be fastened at any desired adjustment by means of a set screw 3.

4 designates the slotted link now commonly employed in reversing gear but in carrying out the present invention said link is provided with an arm designated generally at I and in the preferred embodiment thereof embodying upper and lower bars 5 and 6, respectively, bearing a fixed relation to the link 4 and connected at their opposite extremities by a cross bar 7 having angular end portions 8 adapting said cross bar to be detachably connected to the bars 5 and 6 by means of suitable fasteners 9 such as screws or bolts.

Slidable between the bars 5 and 6 of the arm I and in the slot formed between said bars is a runner designated generally at J and composed of two sections divided about centrally along the line 10 so as to enable said sections to be applied around the eccentric 1 and removed therefrom, the sections of the runner being fastened together at 11. Each section of the runner J is formed with a semi-circular groove 12 to receive the peripheral edge of the eccentric 1 thereby retaining the eccentric and the runner in a certain relation to each other, permitting the eccentric to turn within the runner while the runner slides back and forth in the slotted arm of the link 4. Along its opposite faces the runner J is provided with grooves 13 to receive the adjacent edges of the top and bottom bars 5 and 6, whereby the runner and slotted arm are maintained in a certain relation to each other.

The link 4 is provided with oppositely extending trunnions 14 which are journaled in bearings 15 on posts or pedestals 16 extending upwardly from the engine bed, said posts or pedestals being connected by a bearing arch 17 in which is journaled a rock shaft 18 having at one end a crank arm 20 from which a connecting rod 21 extends to the reversing lever 22. At its opposite end the rock shaft is provided with a relatively long crank arm 23 the extremity of which is deflected or extended inwardly as shown at 24 and connected pivotally at 25 to parallel links 26 which are in turn pivotally connected at their lower extremities to the link block 27 slidable in the slot of the link 4 and having connected thereto a U-shaped coupling 28 to which is secured the adjacent end of a connecting rod 29 the opposite end of which has a pivotal connection at 30 with the slide hereinabove referred to and to which the stem of the slide valve is attached.

From the foregoing description taken in connection with the accompanying drawings, it will now be understood that as the crank shaft 2 revolves, carrying with it the eccentric 1, the runner J is caused to slide back and forth in the slotted arm of the link 4, at the same time moving upwardly and downwardly under the action of the eccentric 1 and thereby rocking the arm of the link and also the link, the latter serving through the connecting rod to impart movement to the slide valve controlling the admission of steam to the cylinder and the exhaust of the same therefrom.

The construction referred to is exceedingly strong, durable and reliable, there is little liability of lost motion and the construction as a whole is more compact than the construction now in common use and embodying, as above noted, a pair of eccentrics together with eccentric straps and rods for operating the link of the reversing gear. The eccentric 1 may be adjusted by means of the set screw 3 to produce the necessary lead of the valve.

What I claim is:—

In reversing gear for steam engines, the combination of a rotary crank shaft, a centrally pivoted link, a slotted arm projecting from said link and embodying parallel bars in spaced relation to each other formed integrally with the link, an eccentric on the crank shaft, an eccentric-actuated runner slidable in said slotted link arm and directly engaging said parallel bars whereby an oscillatory movement is imparted to said arm and link, and a detachable cross bar at the end of said slotted arm connecting the parallel bars thereof to admit of slidable assemblage of the runner and link arm.

In testimony whereof I affix my signature in presence of two witnesses.

PHILIZA H. FONTAINE.

Witnesses:
A. H. JOHNSON,
WM. ANTON.

Copies of this patent may be obtained for five cents each, by addressing the "Commissioner of Patents, Washington, D. C."